US012650170B2

(12) United States Patent
Venkatachalam et al.

(10) Patent No.: US 12,650,170 B2
(45) Date of Patent: Jun. 9, 2026

(54) INTEGRATED DISCONNECT AND PARK LOCK ACTUATION SYSTEM

(71) Applicant: Magna Powertrain of America, Inc., Troy, MI (US)

(72) Inventors: Vignesh Venkatachalam, Farmington Hills, MI (US); Opinder Sharma, Rochester Hills, MI (US); Devin Ryman, Macomb, MI (US); Alexander Sandstrom, Oakland Township, MI (US)

(73) Assignee: Magna Powertrain of America, Inc.

( * ) Notice: Subject to any disclaimer, the term of this patent is extended or adjusted under 35 U.S.C. 154(b) by 0 days.

(21) Appl. No.: 19/089,612

(22) Filed: Mar. 25, 2025

(65) Prior Publication Data

US 2025/0305581 A1      Oct. 2, 2025

Related U.S. Application Data

(60) Provisional application No. 63/570,473, filed on Mar. 27, 2024.

(51) Int. Cl.
*F16H 63/34* (2006.01)
*F16H 63/18* (2006.01)
*F16H 63/30* (2006.01)

(52) U.S. Cl.
CPC ......... *F16H 63/3466* (2013.01); *F16H 63/18* (2013.01); *F16H 63/304* (2013.01); *F16H 63/3408* (2013.01); *F16H 63/3441* (2013.01)

(58) Field of Classification Search
CPC .......... F16H 63/08; F16H 63/16; F16H 63/18; F16H 63/304; F16H 63/32; F16H 63/3408; F16H 63/3441; F16H 63/3466
See application file for complete search history.

(56) References Cited

U.S. PATENT DOCUMENTS

| | | | |
|---|---|---|---|
| 8,647,237 B2 | 2/2014 | Prix et al. | |
| 9,242,623 B2 | 1/2016 | Burgardt et al. | |
| 9,845,834 B2 | 12/2017 | Kohlbock et al. | |
| 11,085,534 B2 * | 8/2021 | Kwon | F16H 61/32 |
| 2007/0272511 A1 * | 11/2007 | Saitoh | F16H 63/3466 192/219.5 |
| 2009/0193931 A1 * | 8/2009 | Burgardt | F16H 63/3433 74/577 M |
| 2021/0332881 A1 * | 10/2021 | Nakao | F16H 63/3466 |
| 2023/0220897 A1 * | 7/2023 | Qiu | F16H 63/3466 192/219.5 |

* cited by examiner

*Primary Examiner* — Richard M Lorence
(74) *Attorney, Agent, or Firm* — Dickinson Wright PLLC

(57) ABSTRACT

An actuation system of actuating both a disconnect device and a park lock is provided. The system includes a motor actuator that drives an oil pump, with the same output of the motor actuator controlling the disconnect device and the park lock. The system includes a translator mechanism, which converts rotary movement of a selectable output shaft into linear movement of a lock collar. Rotation in the first direction sequentially engages the disconnect device and then the park lock, while maintaining the disconnect device in the connected state. Rotation in the second direction first disengages the park lock and then the disconnect device. The selectable output mechanism may be a selectable clutch that, when connected, transfers forward or backward rotary movement of the motor actuator output to shift the translator forward or backward.

20 Claims, 6 Drawing Sheets

INTEGRATED DISCONNECT AND PARK LOCK ACTUATION SYSTEM

CROSS-REFERENCE TO RELATED APPLICATIONS

This application claims the benefit of U.S. Provisional Patent Application No. 63/570,473, filed Mar. 27, 2024, the content of which is incorporated by reference in its entirety.

FIELD

The present disclosure relates to a drive axle for motor vehicles with an integrated actuating system to activate a shaft disconnect and a park lock. More particularly, the present disclosure relates to an actuation system that is driven by a single actuator which normally rotates an oil pump, but may selectively actuate a shaft disconnect clutch and a separate park lock system.

BACKGROUND

This section provides background information related to the present disclosure which is not necessarily prior art.

In view of the recent commitment of most motor vehicle OEM's to develop electric vehicles (EV's), various driveline and axle arrangements have been developed. These include EVs where a single axle is provided with an electric motor to propel a vehicle. This may be a front axle or a rear axle. In other applications, both axles include an electric motor for added performance or improved tractive capability. Often when EVs include a front and rear electrically powered axle, one of these will provide the primary source of power during vehicle operation and the other axle, known as a secondary axle, will provide motive assist and regeneration only during specific vehicle operating conditions. A secondary axle may include a disconnect system allowing the motor to be disengaged from the ground engaging wheels on the secondary axle to prevent motor and geartrain backdrive. This is to reduce back EMF within a permanent magnet motor or provide increased efficiency, because a disconnect will result in less rotational and churning losses of the gears, shafts, and bearings within the secondary axle. The disconnect clutch is normally positioned between two concentric shafts or between a gear and a shaft. An example of a known disconnect clutch actuated by a linearly moving solenoid is described in U.S. Pat. No. 9,845,834B2, while U.S. Pat. No. 8,647,237 provides actuation by a rotating electric motor.

The electric motor and inverters of these electrified axles also require cooling systems to maintain a proper operating temperature. The geartrain and bearing systems of the electrified axles require oil to be distributed to provide lubrication and remove heat during operation. Therefore, many electrified axles include an oil pump which can be driven mechanically off the gearset or via a separate electric motor to provide oil to these various consumers. Utilizing an electric motor beneficially provides flexibility in location, because there is no restriction in requiring the pump to be coupled to the geartrain. Also, an electric oil pump may be selectively controlled and therefore shut off when not required which is often the case in a secondary axle when no power is provided and the disconnect is engaged.

Axle systems in EVs also require utilization of a park lock system to meet safety requirements to ensure a vehicle remains stationary, particularly on grades or uneven terrain, when the vehicle is shut off and unattended. Electrified axle systems have utilized similar park lock systems from traditionally powered transmission where a parking pawl (or pin) engages a notched ring or parking gear that is attached to the transmission's output shaft when the transmission shifter lever is placed in the "P" Park position by the operator. Such park lock mechanisms may include a parking gear, parking pawl, actuator rod, cam collar, cam plate, pivot pin, and parking pawl return spring. An example of a park lock system is described in DE202008001760U1 and U.S. Pat. No. 9,242,623B2. These various components are designed so that the parking pawl tooth collides and overrides the parking gear teeth (ratchets) until a safe engagement speed for the vehicle is reached. When the parking pawl is engaged to the park gear, the transmission's output shaft (and drive wheels) are prevented from turning in either direction ensuring the vehicle from rolling away if on a grade. Typically, such park lock systems are provided on the primary axle, with no park lock function provided in the secondary axle. However, situations do arise in certain applications, due to high vehicle mass or expected operation and parking on extreme grades with unknown surface coefficient, where a park lock system is provided also in the secondary axle. Such a solution may utilize alternative, simplified methods to lock an output shaft or other shaft which is indirectly coupled to the drive wheels using methods different than a traditional park lock mechanism. The alternative solutions may include an arrangement where a shaft or gear is fixed to the axle housing, effectively grounding the geartrain to the housing and preventing rotation of the drive wheels from rotating, thereby providing park lock capability beyond the park lock system of the primary axle. Such a simplified park lock or axle lock system may be actuated in a simpler manner than traditional park lock systems.

For a secondary EV axle where a disconnect, a simplified park lock, and an oil pump is required there is an opportunity for improvements when compared to providing separate systems. Dependent on where the location of the simplified park lock is relative to the disconnect within the geartrain, there is a possibility utilizing a separately actuated park lock, and disconnect could result in an issue where a disconnect is disengaged not allowing the park lock to provide proper functionality because the vehicle wheels are no longer locked due to the disconnect being disengaged. This risk is increased when one of the actuation systems fails and the actual condition of the disconnect or park lock is not properly sensed. Therefore, it would be beneficial to provide a system with a single primary actuator which can drive an oil pump and selectively engage a disconnect and a simplified park lock system where each operating condition is known by the physical relationship of components or can be more easily determined by sensing solutions.

SUMMARY

This section provides a general summary of the many aspects associated with the teachings of the present disclosure and is not intended to be considered a complete listing of its full scope of protection nor all of its features and advantages.

Embodiments of the present disclosure include a controllable clutch or an actuator shaft rotation changing arrangement to selectively actuate a rotary to linear translator, to further shift the shaft disconnect and park lock in various stages of engaged or disengaged conditions, in a parallel arrangement to the oil pump driving shaft. This integrated actuation system provides an alternative to separately actuated systems and has improved safety functionality.

It is an aspect of the present disclosure to provide an actuation system where a single primary actuator motor provides power to an oil pump and is also utilized to shift a park lock mechanism and a disconnect device within the geartrain.

It is an aspect of the present disclosure to utilize a selectable clutch to control engagement of the disconnect device and park lock mechanism.

It is a related aspect of the present disclosure to utilize a selectable clutch, which is provided as a positive locking clutch requiring the actuator motor to stop rotation prior to the clutch engaging and disengaging, or a non-positive locking clutch, which allows engagement and disengagement of the disconnect and park lock without change in the actuator motor speed.

It is a related aspect of the present disclosure for the oil pump to be backdriven during various operational conditions of the park lock and disconnect engagement mechanisms.

It is an aspect of the present disclosure to provide a transmission in place of the selectable clutch to eliminate the backdriving of the oil pump during various operational conditions of the park lock and disconnect engagement mechanisms.

It is a related aspect of the present disclosure to provide a transmission that is shifted by a change in the actuator motor rotation.

It is a related aspect of the present disclosure to utilize a rotary to linear translation device providing linear actuation of park lock and disconnect based on rotational movement of the shift shaft driven by the actuator motor.

It is a related aspect of the present disclosure to provide a simplified park lock, which engages a locking collar between the geartrain and housing of the axle.

It is an aspect of the present disclosure to provide an improved method of operation, where the states of the park lock and the disconnect are mechanically linked to prevent unintended roll away of the vehicle.

It is an aspect of the present disclosure to provide that the actuator selectively drives a translator, converting the rotary motion of the actuator into linear motion, to change operating states for a disconnect device and park lock sequentially.

It is an aspect of the present disclosure to provide a lock collar that moves first from a disconnect to a connected mode, and then moves further to engage a housing to provide a connected and park lock mode.

It is an aspect of the present disclosure to provide an emergency override to allow disengagement of the park lock by displacing the lock collar away from the grounding feature in the housing, by applying a manual mechanical force to the shift fork.

These and other features and advantages of the present disclosure will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DETAILED DESCRIPTION

The present disclosure is related to an electrically driven axle which includes an integrated actuating system which is driven by a single motor actuator which normally rotates an oil pump but may also selectively actuate a disconnect device and a separate park lock mechanism as required. Embodiments described include a selectable output mechanism having a selectable output shaft, which may be controllable clutch or a controllable transmission that can change rotational output directions, to selectively actuate a rotary to linear translator to further shift the disconnect device and park lock mechanism in various stages of engaged or disengaged conditions. The integrated actuation system provides an alternative to separately actuated systems, providing improved safety functionality.

Figure 1:
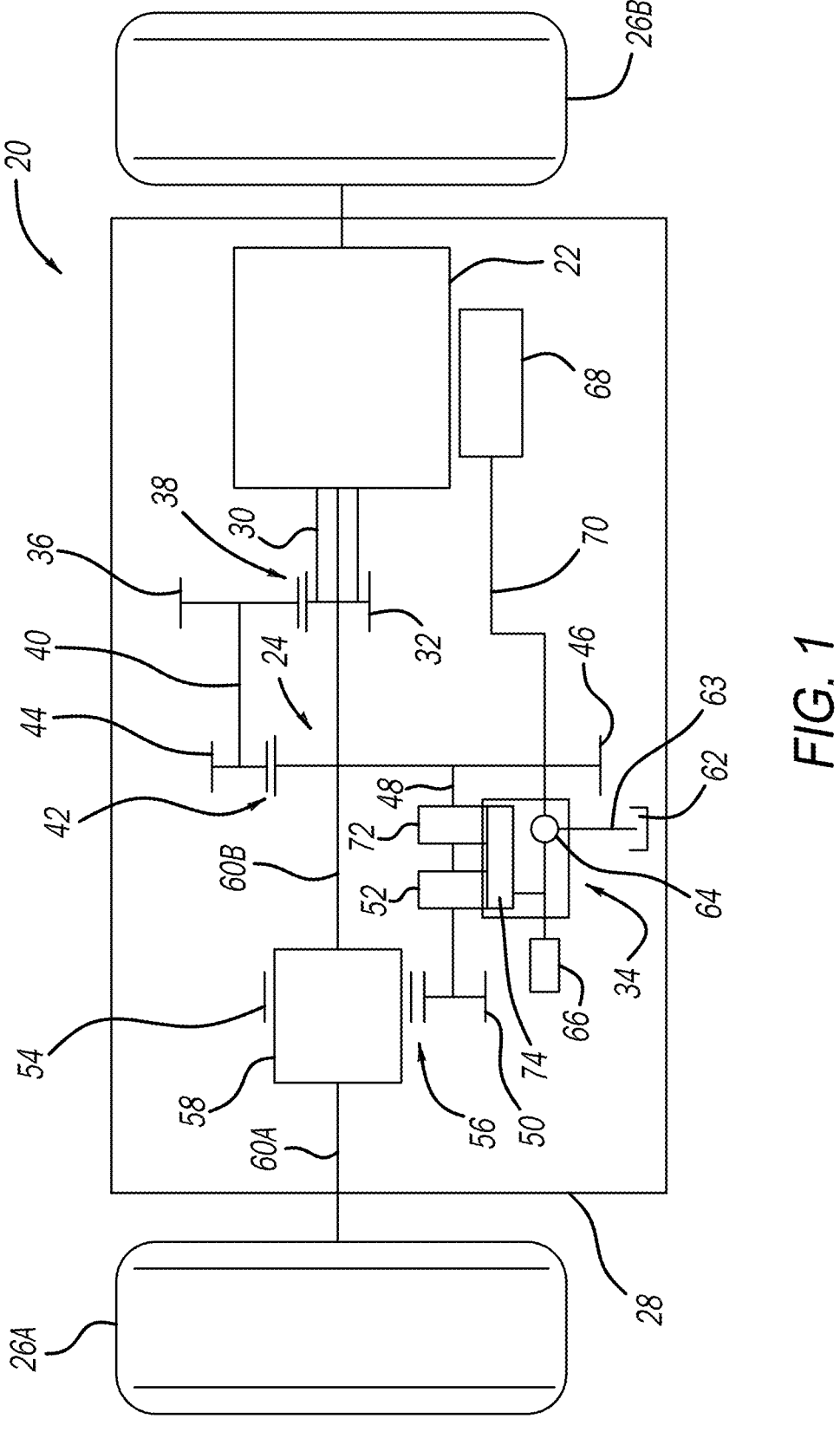
FIG. 1 is a cross sectional view of an electric drive axle of the present disclosure having an integrated disconnect and park lock system.

With initial attention directed to FIG. 1, a cross section of the electrically driven axle 20 of the present disclosure is provided. Electrically driven axle 20 includes an electric traction motor 22 controlled by an inverter and which is supplied energy from a rechargeable battery pack, with a geartrain 24 that transfers power from the electric motor 22 to ground engaging wheels 26A and 26B. Geartrain 24 and motor 22 are supported, mounted, and surrounded by a housing 28 and installed into the vehicle. Electric motor 22 outputs power via a rotor shaft 30 driving an input gear 32 via a fixed connection. An example of a power transmitting geartrain 24 will be described that aligns with FIG. 1, although other geartrain arrangements may be utilized with integrated actuator 34 described herein.

Input gear 32 is meshed with high speed driven gear 36 to create a constant meshed high speed gear set 38. A transfer shaft 40 transmits power from the high speed gear set 38 to a low speed gearset 42. Transfer shaft 40 is coupled to low speed drive gear 44 which is meshed with low speed driven gear 46. Low speed driven gear 46 is coupled to final transfer shaft 48. Final transfer shaft 48 may be selectively engaged to either final drive gear 50 or low speed driven gear 46 depending on the operational condition of disconnect device 52 to interrupt power flow between ground engaging wheels 26 and electric motor 22. Such a disconnect device 52 is utilized in secondary axles to prevent the creation of back EMF in permanent magnet type motors when backdriven. Placing the disconnect as close as possible to the ground engaging wheels 26 provides the highest reduction of drag losses when not powered, as it results in a significant portion of geartrain 24 no longer rotating when disconnect device 52 is disengaged. Final drive gear 50 is constantly meshed with final driven gear 54 to form a final drive gearset 56. Final driven gear 54 is fixed for rotation to a differential assembly 58, which includes a first differential output driving a left axle shaft 60B and a second differential output driving a right axle shaft 60A. Each respective axle shaft 60A, 60B is coupled to ground engaging wheels 26.

Because housing 28 surrounds geartrain 24 and motor 22, a portion of the internal volume within the housing 28 includes oil to lubricate the rotating components of geartrain 24, and may also be utilized as a cooling medium for the electric motor 22. Within housing 28, a sump 62 is provided to collect the oil. An oil pump 64 is powered by an electrically driven actuator 66, pulling oil from sump 62 via sump supply 63 and distributing the oil under pressure to a consumer 68 via oil feed 70. The consumer 68 may include using the oil to cool electric motor 22, lubricate geartrain 24, or any other uses. Due to the need for a constant pressurized source of oil for consumer 68, electrically driven axle 20 is required to utilize such an actuator 66 driving oil pump 64 on a continuous basis.

Electrically driven axle 20 includes an integrated actuator system 34 that utilizes an actuator motor 66, which is normally primarily used to driving oil pump 64 for further functionality. The integrated actuator system 34 is utilized to change the state of the park lock mechanism 72 and disconnect device 52. Park lock 72 and disconnect device 52 are located adjacent to each other on the final transfer shaft 48 in this example. Park lock 72 provides the ability to provide a mechanical positive connection between the final transfer shaft 48 and the housing 28, as will be shown in later figures. This connection prevents rotation of geartrain 24, particularly final transfer shaft 48, final drive gearset 56, differential assembly 58 and, in turn, axle shafts 60 and ground engaging wheels 26, to hold the vehicle against rolling on a grade or uneven surface. Other locations of the park lock 72 and disconnect device 52 may also be provided within geartrain 24 and utilize the integrated actuator system 34.

Actuator 66 selectively drives translator 74, which converts the rotary motion of actuator 66 into linear motion to change the operating states for the disconnect device 52 and park lock 72 sequentially. Such an arrangement, which additionally uses the actuator motor 66 in the integrated actuator system 34, beyond its primary use of driving the oil pump, provides cost and packaging benefits when compared to utilizing separate actuators to shift the park lock 72 and disconnect device 52. As will be further explained, the integrated actuator system 34 also improves functional safety improvements, as the actual states of park lock device 72 and disconnect device 52 can be positively determined, and a reduction in electrically actuating devices may reduce failure modes.

Figure 2:
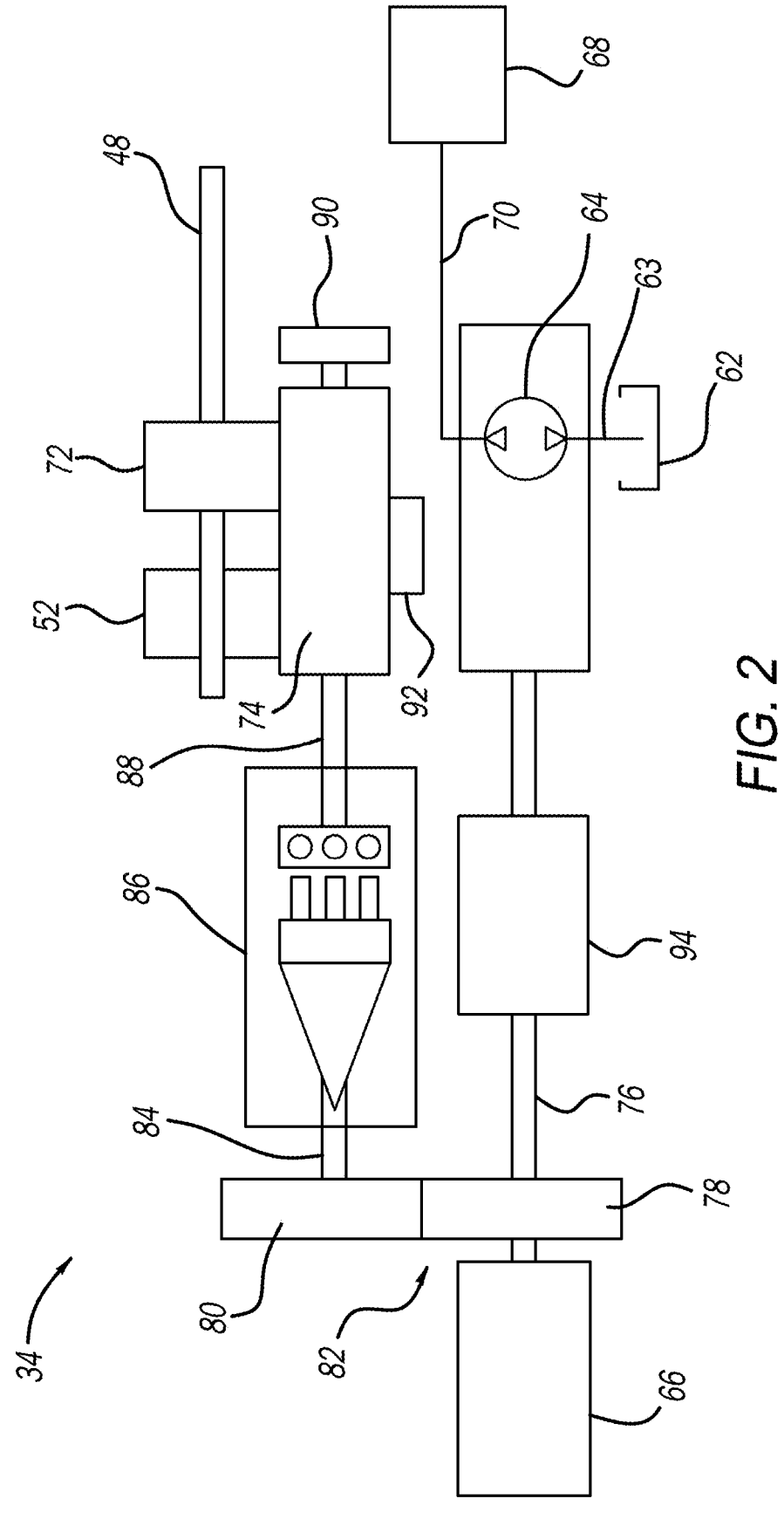
FIG. 2 is a first embodiment of the integrated disconnect and park lock system.

Referring to FIG. 2, further details of a first embodiment of integrated actuator system 34 will be provided. Actuator 66 is rotatably connected to an oil pump drive shaft 76. An actuator drive gear 78 is coupled to oil pump drive shaft 76. When actuator 66 is rotating, both oil pump drive shaft 76 and actuator drive gear 78 will be driven, causing oil pump 64 to rotate, pulling oil from sump 62 via sump supply 63 and distributing the oil under pressure to a consumer 68 via oil feed 70. Actuator drive gear 78 is meshed with an actuator driven gear 80 to form actuator gear set 82 resulting in a secondary and parallel power path relative to oil pump drive shaft 76. Of course, additional or different gearset arrangements may be provided for actuator gearset 82 as required to obtain the proper torque multiplication of actuator 66.

Actuator driven gear 80 is coupled to and drives a clutch input shaft 84. A selectable clutch 86 is provided between clutch input shaft 84 and clutch output shaft 88. Clutch 86 may be a positive locking clutch actuated by a solenoid or other simplified actuation system. Such a positive locking clutch may be an arrangement where two components within clutch 86 mate together when actuated to transmit torque via a dog clutch or face gear arrangement. A positive locking clutch of this type require generally equivalent speeds of the internal torque transmitting components when engaged, thus requiring actuator 66 rotational speed to be reduced to zero. When a clutch 86 is disengaged, the dog clutch or face gear arrangement is separated apart by a biasing element such a as a spring to result in separation of the components within clutch 86, and an operating mode where torque is not transferred from clutch input shaft 84 to clutch output shaft 88.

Clutch 86 may alternatively be a frictional clutch, which allows engagement of the internal clutch components even when a more significant difference of speed is occurring between clutch input shaft 84 and clutch output shaft 88, and providing torque transfer through clutch 86 when fully engaged. Such a frictional clutch arrangement may also utilize a biasing device to separate the frictional elements to provide a non-torque transmitting mode when disconnected. Independent of which type of clutch (positive locking or frictional) is utilized for clutch 86, the clutch output shaft 88 provides power to translator 74 via the rotation of output shaft 88 when clutch 86 is engaged. A further gear reduction not shown may be included between output shaft 88 and translator 74 depending on the required torque to drive translator 74.

Translator 74 converts the rotational input of clutch output shaft 88 into a linear movement, which will move disconnect 52 and park lock 72 between disengaged and engaged positions located on the final gear transfer shaft 48. Translator 74 is positioned in a manner to interact with disconnect 52 and park lock mechanism 72, in this case near/adjacent and parallel to the final gear transfer shaft 48. A rotational sensor 90 may be fixed to clutch output shaft 88 to determine the rotational position of clutch output shaft 88. A linear sensor 92 may also be included in translator 74 to receive further positional details of translator 74. Further details of translator 74, disconnect 52, and park 72 will be provided in later figures.

Continuing to refer to FIG. 2, the operational method of the integrated actuator 34 will be further described. As described earlier, actuator 66 primarily rotates in a first direction to provide power to oil pump 64 at a given pumping rotational speed. A central controller receives various vehicle inputs including but not limited to those from sensors 90 and 92 to determine status and provide control instructions to actuator 66 and clutch 86. When there is a need to either actuate disconnect mechanism 52 or park lock system 72, a command will be provided to actuator 66. Depending on the type of clutch 86 utilized, actuator 66 rotational speed may be changed or decreased to zero. If a positive locking clutch 86 is used, actuator 66 will be slowed and, once stopped, clutch 86 will be engaged. Actuator 66 will then begin to rotate in the same first direction, driving both oil pump 64 and translator 74. The speed of actuator 66 is controlled with a defined actuation speed, causing either disconnect 52 or park lock 72 to change state. Once the commanded state of either disconnect 52 or park lock 72 is achieved, actuator 66 will stop, and the clutch 86 will be released resulting in no torque transfer to clutch output shaft 88 and translator 74. Once the clutch 86 is fully released, actuator 66 will return to a given pumping rotational speed. Because the interruption of rotation provided to oil pump 64 is a very short period of time, driven by clutch 86 actuation time and any speed changes of actuator 66, no detrimental effects are provided by the momentary lack of oil flow to consumer 68.

Translator 74 includes at least two discrete linear displacement positions. Additional linear displacement positions may also be included. Translator 74 may be designed with two different functionalities. The first functionality includes an arrangement where clutch output shaft 88 will rotate no more than one revolution (360 degrees) in a first direction, and translator 74 provides linear movement defined by the characteristics of translator 74. In this arrangement, once full linear travel is provided, clutch output shaft 88 must be rotated in an opposite second rotational direction to return translator 74 to is original operating condition. To achieve driving of the clutch output shaft 88 in the opposite second direction, actuator 66 drives in the opposite direction, resulting in returning the translator 74 back towards its original state but also possibly rotating oil pump 64 in a direction opposite of its normal pumping direction. Depending on the type of oil pump 64 utilized, damage may occur when rotated in the opposite direction, such that a one way clutch 94 may be provided to prevent such damage. A self-actuating one way clutch 94 will provide a first torque transmitting mode in a first direction, therefore in the direction for pump 64 to properly operate, and a second non torque transmitting mode where the oil pump 64 will not rotate in response to rotation of the actuator 66. Such a one way clutch 94 may be a sprag, roller, or other arrangement as known in the art. The second non torque transmitting mode occurs for the same rotational direction when the actuator 66 is operating in the direction to move translator 74 back to its original state. This type of translator 74, having 360 degree travel and reversible rotation, will be described in more detail in FIG. 5A.

Alternatively, translator 74 may be designed to "reset" after more than one rotation (>360 degrees) of clutch output shaft 88. In such an arrangement actuator 66 may only rotate in a single first direction, being the same direction as is utilized in driving the oil pump 64. The operation of clutch 86 and coordination of actuator 66 motor speed is as previously described although only in one rotational direction. This arrangement eliminates the need to utilize one way clutch 94 in cases where the oil pump 64 may be damaged by being rotated in the opposite of its primary direction to prevent damage or re-priming concerns.

The integrated actuator 34, for use in sequentially actuating a disconnect 52 and park lock 72, provides the benefits of ensuring the disconnect 52 is always engaged when park lock 72 is engaged. The use of the clutch 86 in conjunction with a primary actuator 66 provides for a system where the clutch 86 is controlled before an unintended engagement or disengagement may occur, adding a level of controllability and security to the overall function of changing states. As will be shown, an engaged park lock 72 is desired to be the last state translator 74 shifts into, providing a hard end-stop where further detection can be utilized, including measurement of actuator current against the end-stop, providing a further way to ensure that the park lock state is achieved. Utilizing a single actuator 66 to achieve such functionality provides the potential for a single sensor to provide feedback, which can be the rotary sensor 90 and/or the linear sensor 92, or another sensor. The usage of both sensors provides further safety and redundancy.

The benefits of such a system are evident. For instance, if disconnect 52 and park lock 72 were instead actuated by distinctly separate actuators, further sensing and communication of the states of each of these separate systems would need to be verified to ensure the necessary engaged and disengaged states were achieved prior to additional commands by a controller. If a failure of communication occurred from one system, the second system would be unsure of the actual state of operation.

Figure 3:
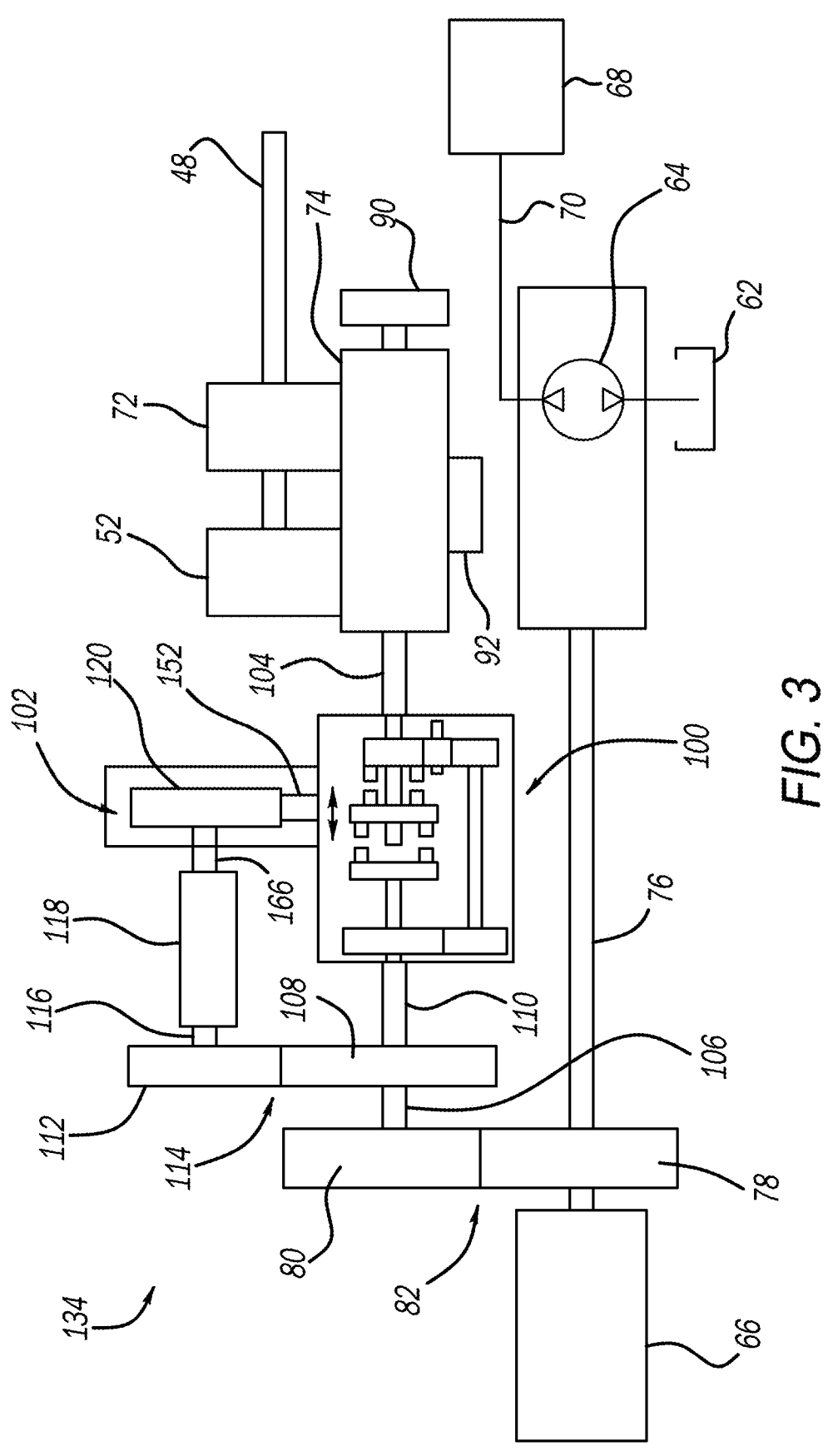
FIG. 3 is a second embodiment of the integrated disconnect and park lock system.

FIG. 3. provides a second embodiment, having integrated actuator 134, where clutch 86 (of FIG. 2) is replaced with a device where actuator motor 66 rotates in a single, first rotating direction to drive translator 74 to change the states of disconnect device 52 and park lock 72. In this integrated actuator 134, a transmission device 100, whose operating states are changed by shifter 102, is placed in the power flow where clutch 86 (of FIG. 2) was previously located. Transmission 100 enables actuator motor 66 to rotate in the first direction while allowing translator 74 to operate in two different directions. Actuator motor 66 will only operate in a second opposite rotating direction to change the operational state of transmission 100. Transmission 100 provides three modes based on the transmission output shaft 104 rotational direction: a forward rotating mode, a neutral non torque transferring mode, and a reverse rotation mode. These modes of transmission 100 are changed by the shifter 102, which functions based on the rotational direction of actuator motor 66, without the need for an additional actively controlled or powered device such as clutch 86 of the first embodiment.

Similar to the previous embodiment, actuator motor 66 is rotatably connected to oil pump drive shaft 76. An actuator drive gear 78 is coupled to oil pump drive shaft 76. When actuator 66 is rotating, both oil pump drive shaft 76 and actuator drive gear 78 are driven, resulting in oil pump 64 rotating, pulling oil from sump 62 via sump supply 63 and distributing the oil under pressure to consumer 68 via oil feed 70. Actuator drive gear 78 is meshed with an actuator driven gear 80 to form actuator gear set 82 resulting a secondary and parallel power path to oil pump drive shaft 76. Actuator driven gear 80 in this second embodiment is coupled to a shifter actuator shaft 106. Shifter actuator shaft 106 is coupled to a shifter drive gear 108 and continues through the shifter drive gear 108 to become transmission input shaft 110. Shifter drive gear 108 is meshed with shifter driven gear 112 to from shifter gear set 114. Coupled to shifter driven gear 112 is shift shaft 116. A self-activating one way clutch 118 is positioned in the torque flow on shift shaft 116 between shifter driven gear 112 and shifter gear 120 within shifter assembly 102. The purpose of one way clutch 118 is to selectively drive shifter gear 120 only when required to activate shifter assembly 102 to shift transmission 100 from one operating mode or output rotational direction to another. The one way clutch 118 will transmit torque only when rotated in a first direction. In the second opposite direction, no torque transfer will occur through one way clutch 118. Such a one way clutch 118 may be a sprag, roller, or other arrangement as known in the art. Therefore, the power from actuator motor 66 is provided to oil pump 64, shifter assembly 102 on a selective basis dependent on the actuator motor 66 direction, and to translator 74 through transmission 100, to provide the functionality to change states in the disconnect 52 and park lock 72 mechanisms without the need of a secondary device controlled electronically further improving costs and reliability. The functionality of translator 74 is the same as utilized in the previous embodiment, only driven instead by the transmission output shaft 104.

Figure 4:
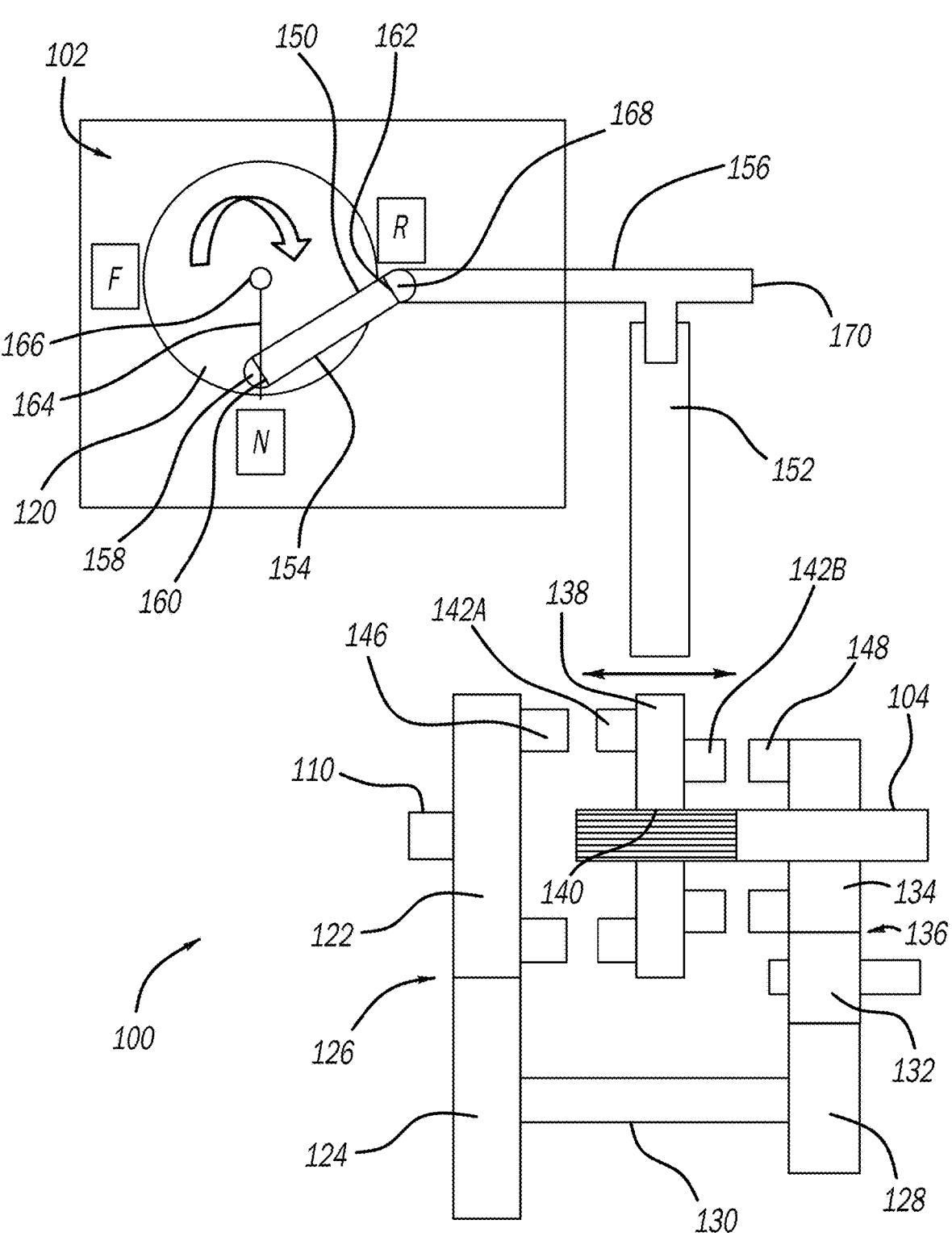
FIG. 4 is a view of the shifter assembly and transmission of the integrated disconnect and park lock system of the second embodiment.

FIG. 4. illustrates the interaction and functionality of shifter assembly 102 and transmission 100. Transmission 100 is driven by a transmission input shaft 110 which is coupled to transmission input gear 122. Transmission input gear 122 is meshed with countershaft input gear 124 to form an input gearset 126. Countershaft input gear 124 and countershaft output gear 128 are joined to rotate together with countershaft 130. The countershaft output gear 128 is meshed to an idler gear 132 which in turn is meshed with transmission output gear 134 to form transmission output gearset 136. Idler gear 132 reverses the rotational direction between countershaft output gear 128 and transmission output gear 134. Transmission output gear 134 is supported by and allowed to rotate freely around transmission output shaft 104. Therefore, power that is provided to transmission 100 via transmission input shaft 110 will not transfer through to transmission output shaft 104 unless further mechanical connections are made within transmission 100. Note, although not explicitly shown, the various transmission shafts described are supported by housing 28 via various bearing arrangements to allow free rotation. The required connections to transmit power through transmission 100 are completed by a shift collar 138. Shift collar 138 is splined to transmission output shaft 104 and allowed to translate axially along spline 140 while transmitting power to transmission output shaft 104. Shift collar 138 includes features on both sides which may allow a positive locking engagement with transmission input gear 122 and transmission output gear 134. It may also be possible to utilize a non-positive locking connection such as a frictional clutch surface to transmit torque through transmission 100. As an example, shift collar 138 may include axial teeth 142 extending from the body 144 of shift collar 138 in first and second opposite directions. Axial teeth 142A extend from body 144 toward transmission input gear 122 while axial teeth 142B extend toward transmission output gear 134. Transmission input gear 122 has a similar arrangement of axial teeth 146 extending axially towards shift collar 138. Transmission output gear 134 has an arrangement of axial teeth 148 extending towards shift collar 138. Shift collar 138 may have three operating positions. A first position is centered between the transmission input gear 122 and the transmission output gear 134 in a manner where no contact is made between the axial teeth. Therefore, no power is transmitted through transmission 100 and translator 74 is not actuated and may be considered to be a "neutral" operating mode. In a second, or forward drive mode of transmission 100, shift collar 138 is moved toward transmission input shaft gear 122 and axial teeth 142A of shift collar 138 engage into the axial teeth 146 of transmission input gear 122. This results in power that is provided to transmission input shaft 110 being transmitted to transmission output shaft 104 directly, with rotation between the input and output being in the same direction due to the connection of the shift collar 138 and output shaft 104 via the torque transferring spline 140. Countershaft 130 will rotate as it is driven by transmission input gearset 126, but because transmission output gear 134 is not fixed to transmission output shaft 104, no power will transfer through this portion of the transmission to the output shaft 104. In a third, or reverse drive mode of transmission 100, shift collar 138 is moved toward transmission output shaft gear 134 and axial teeth 142B of shift collar 138 engage into the axial teeth 148 of transmission output shaft gear 104. This results in the power that is provided to transmission input shaft 110 being transmitted through transmission input gearset 126, countershaft 130, and transmission output gearset 136. Because axial teeth 142B and 148 are engaged in a torque transmitting mode, power from rotation will be provided into shift collar 138 and to output shaft 104 via spline 140. Idler gear 132 within output gearset 136 accordingly reverses the directional rotation of transmission output shaft 104 relative to transmission input shaft 110 when the collar is in the engaged position with the transmission output gear 134 (to the right in FIG. 4, as controlled by actuation of shift fork 152). In one embodiment, the ratio of transmission 100 is operating at a 1:1 ratio but this may be adjusted as needed for the application by adjusting the parameters of gearsets 126 and 136. The functionality of transmission 100 therefore provides the ability to drive translator 74 either in a forward mode or a reverse mode, dependent on the location of shift collar 138, allowing actuator motor 66 to be operated in a single first rotating direction during all translator 74 movements.

Figure 5A:
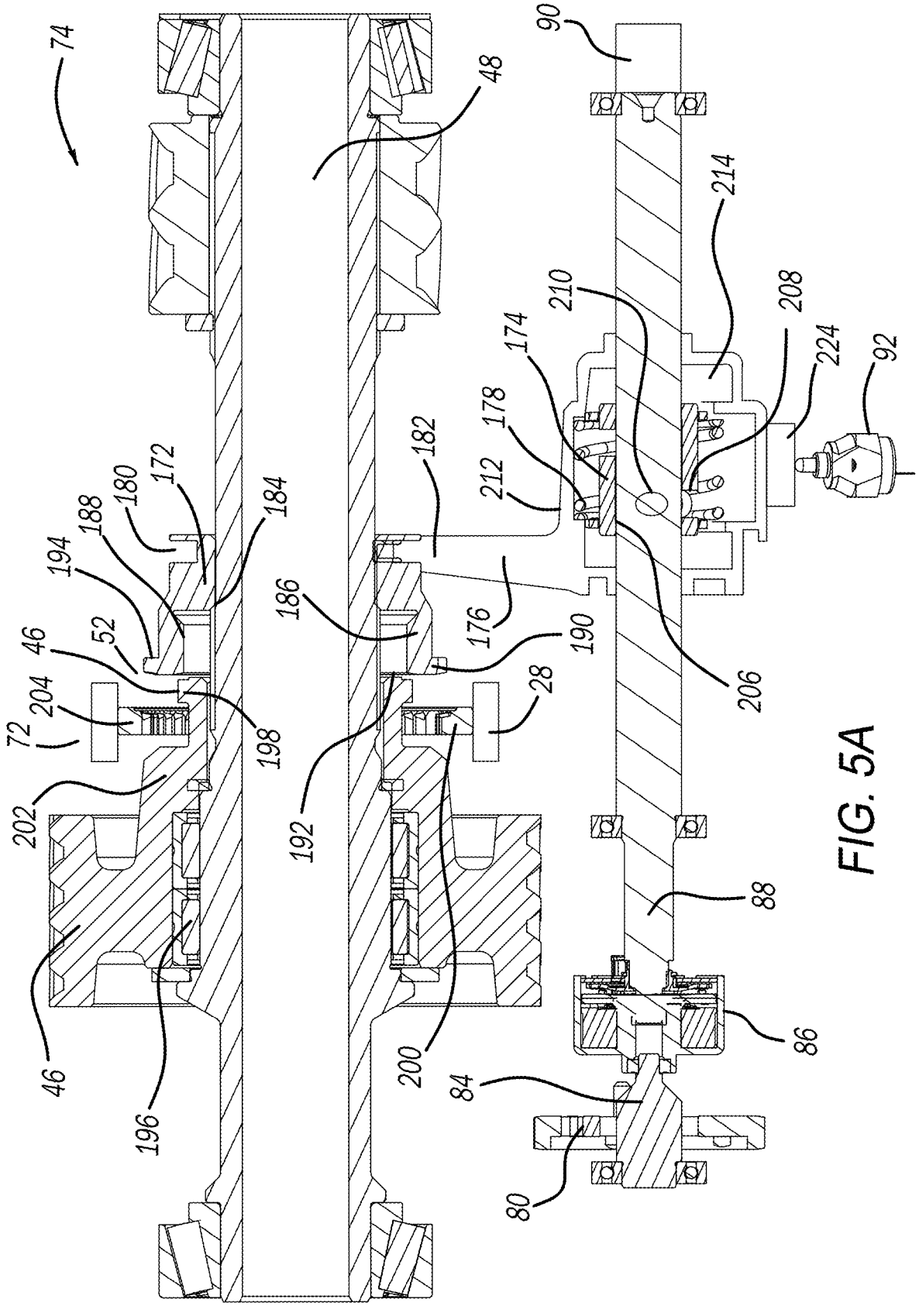
FIG. 5A is a view of the translator used in the integrated disconnect and park lock system.

With continued reference to FIG. 5A, actuator motor 66 may be operated in the second operating direction to operate shifter assembly 102 to shift transmission 100 between the three different modes, forward, reverse, and neutral. The shifting of collar 138 is controlled by the rotation of shifter gear 120, which is driven by actuator motor 66 as previously described. Shifter gear 120 will only rotate when actuator motor 66 is operated in a second opposite direction from normal operation due to the usage of one way clutch 118 on shift shaft 116. When actuator motor 66 is normally operating in a first rotational direction providing power to pump 64 and transmission 100, shifter gear 120 will not rotate, because the one way clutch 118 will not transfer torque in that rotational direction. This will result in no rotation of shifter gear 120 and no activation of shifter assembly 102. When a command is provided to drive translator 74 in a forward or reverse direction, actuator motor 66 will be operated in an opposite direction than normal or primary operation. This opposite or reverse rotation will result in one way clutch 118 being engaged, therefore rotating shifter gear 120. A shift linkage assembly 150 is provided between shifter gear 120 and a shift fork 152 to graphically represent the connection and action between the members. Different or additional linkage arrangements may be used to provide a mechanical connection between shifter gear 120 and shift fork 152 to convert the rotational movement of shifter gear 120 to axial movement of shift fork 152. Shift fork 152 is connected to shift collar 138, thereby controlling movement shift collar 138 axially along the same axis as the transmission input shaft 110 based on the rotation of shifter gear 120 and resulting movement of linear linkage 156 and shift fork 152. Shift linkage assembly 150 may be any arrangement of mechanical components to translate the rotation of shifter gear 120 into axial movement of shift fork 152 and collar 138. In the example shown, shift linkage assembly 150 includes a first radial linkage 154, which may pivot, and a second linear linkage 156, which is restricted to linear movement generally parallel to the axial direction with shift collar 138. This may be achieved by bearing supports between housing 28 and linear linkage 156 not shown. A first pivoting engagement feature 158 may be included on the first end 160 of radial linkage 154 and may be engaged with rotating shifter gear 120 at a radial distance 164 from the rotating axis 166. A second pivoting engagement 168 is provided at the second end 162 of radial portion 154 and joins with the linear shift linkage 156 on its first end 168.

Shift fork 152 is fixed to the second end 170 of the linear linkage 156. As shifter gear 120 rotates about axis, the positon between first pivot 158 and the shift fork 152 will vary. As shown in FIG. 4, when first pivot 158 is at the 6 o'clock position, the shift fork 152 and shift collar 138 are positioned in the neutral mode. As shifter gear 120 rotates clockwise, first pivot 158 will translate to the 9 o'clock position, resulting in radial linkage 154 extending to a horizontal condition and pulling shift fork 152 to the left in FIG. 4. This moves shift collar 138 axially into the forward operating mode (engaged with gear 122). As shifter gear 120 continues to rotate, first pivot 158 will rotationally follow and, eventually, be positioned at the 3 o'clock position, where radial linkage 154 moves shift fork 152 and shift collar 138 axially to the right in FIG. 4, thereby engaging transmission 100 in the reverse mode of operation (collar 138 engaged with output gear 134). Shift gear 120 may continue to rotate only in this direction when actuator motor 66 operates in the second (opposite) rotating condition, continuing to cycle through the three different locations described.

As an example of operation, if transmission 100 is in a neutral mode and actuator 66 is operating to rotate pump 64, and when a request to move translator 74 to engage disconnect device 52 is commanded, actuator motor 66 may stop rotation. Actuator motor may then reverse direction, resulting in one way clutch 118 engaging and shifter gear 120 rotating clockwise to the forward operating location, bringing pivot point 158 to the 9 o'clock position. Shift collar 138 of transmission 100 moves to the left and engages gear 122, thereby providing the forward mode, and actuator 66 will stop its opposite rotation once shift collar 138 reaches the desired location. Actuator 66 would then rotate again in the first normal rotational direction to move translator 74, thereby engaging disconnect device 52.

Once translator 74 achieves the desired position, based on a signal from sensors 90 or 92, actuator motor 66 may again be operated in its second opposite rotational direction, to shift transmission 100 back to neutral mode, driven by shifter gear 120 and shift collar 138 in a similar manner as previously described, and returning end 160 of radial linkage 154 and pivot point 158 back to the 6 o'clock position. Once neutral mode is achieved by transmission 100, actuator motor 66 may again return to its first operating direction, where oil pump 64 would again rotate in a normal pumping rotational direction with disconnect 52 engaged, and translator 74 not moving due to transmission 100 being in neutral mode.

Now turning attention to FIG. 5A, a more detailed illustration of translator 74, disconnect 52 and park lock 72 is shown. Translator 74 is operable to convert bidirectional rotary motion of clutch output shaft 88 (or transmission output shaft 104 of the second embodiment of FIGS. 3 and 4) into bidirectional translational movement of lock collar 172 between its three distinct positions in this example.

Translator 74 is shown to include a cam 174, a translator fork 176, a spring-biasing unit 178, and lock collar 172. Fork 176, cam 174, and spring-biasing unit 178 are located around the clutch output shaft 86. Fork 176 is engaged via a groove 180 in lock collar 172 located, which is positioned around the final drive transfer shaft 48. Fork segment 182 (of fork 176) is interconnected with lock collar 172 in a manner which allows lock collar 172 to rotate along with the rotation of the final gear transfer shaft 48 via spline 184. Spline 184 fixes lock collar 172 and final gear transfer shaft 48 together rotationally in a torque transferring arrangement, but lock collar 172 may move axially along spline 184. Lock collar 172 may be designed to have a bell portion 186 (having a bell-like shape or cup-like shape with an interior space), with teeth formed in the inner and outer circumference of the bell portion 186. Disconnect inner clutch teeth 188 are provided on the inner circumferential surface of bell 186. A flange portion 190 at the open end of bell portion 192 extends radially outward from the body/wall of the bell portion, and includes on its outer circumferential surface an arrangement of park lock collar teeth 194. Adjacent and concentric to lock collar 172, low speed driven gear 46 is provided, which is allowed to freely rotate around final gear transfer shaft 48 via bearing 196 when the low speed driven gear 46 is not engaged with lock collar 172. At the end of the low speed driven gear 46 closest to lock collar 172, low speed driven gear 46 includes disconnect outer clutch teeth 198 that extend radially outward, configured to mesh with the inner teeth 188 that extend radially inward from lock collar 172.

A park lock annular ring 200 is disposed axially between the disconnect outer clutch teeth 198 and the body 202 of low speed driven gear 46. An arrangement of park lock teeth 204 extend radially inwardly on an inner portion of annular ring 200 at a diameter which allows engagement with the outwardly extending park lock collar teeth 194 that are disposed on the flange portion 190 when brought together. Annular ring 200 may be an integral portion of housing 28 and accordingly fixed relative to housing 28, or may be a separate component fixed to housing 28 and made from a material with greater strength and durability than housing 28.

Lock collar 172 may have three distinct operable positions. A first starting position results in disconnect device 52 being disengaged, because there is no contact between lock collar 172 and the low speed driven gear 46 (this position is shown in FIG. 5A). This results in no torque transfer between final gear transfer shaft 48 and low speed driven gear 46, thereby providing an interruption between ground engaging wheels 26 and motor 22 and the portions of geartrain 24 therebetween.

Translator 74, when actuated, may move lock collar 172 to a second position, toward low speed driven gear 46 (to the left in FIG. 5A), via lock collar 172 and spline 184, where the disconnect device 52 is in an engaged or connected mode, with the final gear transfer shaft 48 and low speed driven gear 46 connected for co-rotation. This engaged and connected mode is achieved by the torque transmitting connection of the disconnect inner teeth 188 and disconnect outer teeth 198, providing torque transfer between final gear transfer shaft 48 and low speed driven gear 46 via lock collar 172 and spline 184. In this position, no engagement of park lock 72 is provided at this lock collar 172 position.

When translator 74 is actuated a second time, moving lock collar 172 further to the left in FIG. 5A towards low speed driven gear 46, lock collar 172 will move and still maintain engagement between disconnect inner teeth 188 and disconnect outer teeth 198. While disconnect 52 is still in this engaged and connected state, park lock collar teeth 194 engage with park lock teeth 204 of the park lock 72. Park lock 72 and disconnect 52 are accordingly both engaged in this third lock collar 172 position.

The sequential engagements of the disconnect device 52 first and then the park lock 72, while maintaining an engagement of disconnect device 52, provides improved safety ensuring that the disconnect 52 stays engaged as the park lock 72 is engaged. Annular ring 200 of the park lock 72 may be fixed to housing 28 via a press fit or may be connected to housing 28 with some amount of compliance or movement, particularly allowing for some rotation when engaged by park lock collar teeth 194 of lock collar 172 as it moves towards low speed driven gear 46. If annular ring 200 is not fixed to housing 28 in a tight rotational arrangement, it may improve engagement when transitioning between the second and third positions as a slight rotational indexing of annular ring 200 relative to housing 28 may alleviate any spline block conditions.

Pointing may be provided on all engaging teeth surfaces to further improve shiftability. To provide additional assistance in full engagement of park lock 72, motor 22 may slightly rotate rotor shaft 30 indexing geartrain 24 via a small forward or reverse rotation, as this could rotate low speed driven gear 46 by a few degrees to allow park lock collar teeth 194 to fully engage park lock teeth 204. Translator 74 includes a cam 174 which is a hollow cylindrical member having an inner diameter surface 206 journaled for sliding movement on clutch output shaft 88. A serpentine slot 208 is formed in cam 174 and receives a following pin 210 that is fixed for rotation with clutch output shaft 88.

Fork 176 includes a body portion 212 supported for sliding movement on clutch output shaft 88 and a fork segment 182 which extends from body portion 212 into an annular groove 180 formed in lock collar 172. Body portion 212 defines an interior chamber 214 where cam 174 and spring-biasing unit 178 are located. Spring-biasing unit 178 is operably disposed between cam 174 and body portion 212 of fork 176. Spring-biasing unit 178 functions to urge fork 176 to move axially in response to axial movement of cam 174 while its spring compliance accommodates tooth "block" conditions that can occur between disconnect inner teeth 188 to disconnect outer teeth 198 and park lock collar teeth 194 to park lock teeth 204. As such, spring-biasing unit 178 assures that fork 176 will complete the axial movement of lock collar 172 into both the disconnect engaged and then park lock positions upon elimination of any such tooth block condition. Translator 74 is arranged such that axial movement of cam 174 results from movement of follower pin 210 within slot 208 in response to rotation of clutch output shaft 88 (or transmission output shaft 104 of the second embodiment of FIGS. 3 and 4.

Figure 5B:
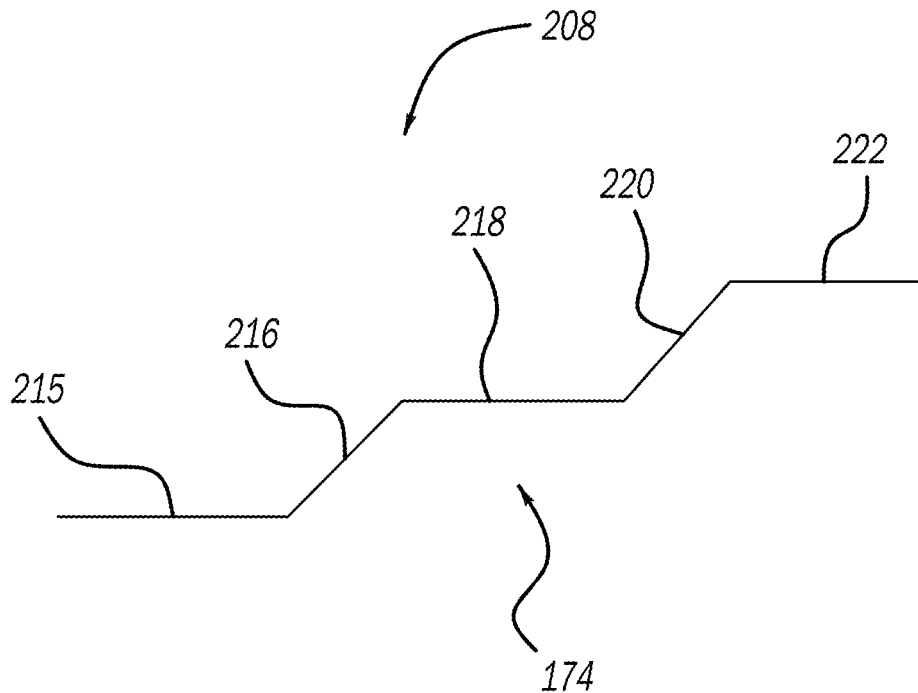
FIG. 5B is a view of the various cam profiles used by the translator to actuate the translator fork.

Referring to FIG. 5B, Slot 208 is designed to allow three distinct axial displacements of fork 176 when operated. The first, starting location, positions fork 176 and therefore lock collar 172 in a disengaged operating condition, where the disconnect inner teeth 188 and the park lock collar teeth 194 are not engaged with any other component. Pin 210 is located in slot 208 at this initial position 215. As clutch output shaft 88 rotates pin 210 will move through slot 208, which includes a first ramp portion 216, a first dwell segment 218, a second ramp portion 220, and a second dwell segment 222. As noted, such movement of cam 174 causes translator fork 176 to move lock collar 172 between its three primary operating locations. Specifically, when it is desired to shift from a disconnect to connected mode, actuator 56 rotates actuator drive gear 78, in turn rotating actuator driven gear 80 which drives clutch input shaft 84. Because clutch 86 will be closed in order for translator 74 to operate, clutch output shaft 88 will rotate, causing concurrent rotation of follower pin 210. Follower pin 210 is installed on clutch output shaft 210, extending outwards from the outer diameter of clutch output shaft 210, to engage into slot 208. Such rotation of the output shaft 88 causes follower pin 210 to move within slot 208 for axially moving cam 174 and fork 176 until collar 172 is located in a disconnect device 52 connected position based on movement provided by ramp 216. Once traveled to place a disconnect mechanism 52 in an engaged state, pin 210 is positioned in dwell segment 218 of slot 208. With lock collar 172 in this connected position, final gear transfer shaft 48 and low speed driven gear 46 are connected, establishing a power transfer from electric motor 22, through geartrain 24, and onto ground engaging wheels 26. Continued rotation of clutch output shaft 88 in the first direction causes follower pin 210 to continue through shift slot 208 from dwell 218, through ramp 220, where lock collar 172 will move, thereby engaging park lock collar teeth 194 into park lock teeth 204, and entering second dwell segment 222, where the park lock 72 and the disconnect 52 are both engaged by lock collar 172. Although slot 208 could have a continual ramp contour, utilization of dwell segments 218 and 222 ensure rotary sensor 90 and linear sensor 92 are able to provide confirmed, stable feedback when the different operating modes of disconnect 52 and park lock 72 are sequentially achieved. Linear sensor 92 may determine fork 176 position by a variable profile 224 on the body 212. Rotary sensor 90 may be used to measure the rotational position of clutch output shaft 88. Further sensing may also be included in actuator motor 66 for further confirmation of various component locations for translator 74.

To disengage the park lock 72 and disconnect mechanism 52, the reverse rotation of clutch output shaft 88 (or transmission output shaft 104 or the second embodiment), will result in pin 210 traveling in the opposite direction along slot 208, from slot position 222 to position 215, actuating the fork 176 and moving the collar 172 away from the low speed driven gear 46.

A manual override may also be provided in the event of loss of electrical power or communication to actuator motor 66 while the park lock 72 is engaged. A mechanical shifting system, operable externally to axle assembly 20, may be provided, which may force shift fork 176 away from the engagement position between park lock collar teeth 194 and park lock teeth 204. A mechanical shifting system may include a rotational lever accessible from the outside of axle assembly 20, which is connected to a sector with a ramp profile to engage a feature on translator fork 176 converting the rotational movement of the external rotational lever into axial movement of fork 176. Because clutch 86 is in an open, non-connected state when not powered and the spring 178 may be overcome, the mechanical lever allows fork 176 to be displaced so that pin 210 may be located in the dwell portion 218 while the disconnect 52 remains engaged, but the park lock 72 is disengaged, allowing emergency movement of the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. An actuation system for actuating a driveline disconnect device and park lock device, comprising:
   a actuator motor, wherein the actuator motor operates in a first rotational direction about a first axis and drives a drive shaft connected to an oil pump to provide pressurized oil to a consumer;
   an actuator gearset coupled to the drive shaft, wherein an actuator driven gear of the actuator gearset drives a selectable output mechanism having a selectable output shaft;
   wherein the selectable output mechanism has an engaged state, in which torque transfers from the actuator driven gear to the selectable output shaft and provides a rotary output to the selectable output shaft when the actuator motor is rotated to a first position, and a disengaged state, in which torque does not transfer to the selectable output shaft and does not rotate the selectable output shaft;

wherein the selectable output shaft is operably connected to a translator mechanism;

wherein the translator mechanism converts the rotary output of the selectable output shaft to a linear output of the translator mechanism when the selectable output mechanism is in the engaged state;

wherein the linear output of the translator mechanism moves a first distance in a first linear direction and shifts the disconnect device of the driveline from a disconnected mode to a connected mode, wherein the linear output of the translator mechanism moves an additional distance in the first linear direction and shifts the park lock into a locked state, wherein the park lock is in the locked state while the connected mode of the disconnect device is maintained when the selectable output mechanism is in the engaged and the actuator motor is rotated to the first rotational position.

2. The actuation system of claim 1, wherein the actuator motor is connected to the oil pump via the drive shaft, wherein the drive shaft is an oil pump drive shaft, wherein the actuator motor operates in the first rotational direction about a first axis and drives the oil pump drive shaft to provide pressurized oil to the consumer.

3. The actuation system of claim 2, wherein the actuator motor operates both the oil pump via the oil pump drive shaft and the translator mechanism via the selectable output mechanism driven by the actuator driven gear.

4. The actuation system of claim 3, wherein the selectable output mechanism is a selectable clutch and the selectable output shaft is a clutch output shaft.

5. The actuation system of claim 4, wherein the actuator motor is operable in the first rotational direction to drive the oil pump and move the translator mechanism in a forward direction and is operable in a second rotational direction to drive translator mechanism in a reverse direction.

6. The actuation system of claim 5, wherein the oil pump drive shaft includes a one way clutch, wherein torque transfers to the oil pump when the actuator motor is operated in the first rotational direction, and the torque does not transfer to the oil pump when the actuator motor is operated in the second rotational direction.

7. The actuation system of claim 4, wherein the selectable clutch is a positive engagement clutch or a frictional clutch.

8. The actuation system of claim 3, wherein the selectable output mechanism is a transmission and the selectable output shaft is a transmission output shaft.

9. The actuation system of claim 8, wherein the transmission has an input shaft fixed for rotation with the actuator driven gear and rotates in response to rotation of the actuator motor, wherein the transmission has three selectable states including a neutral state, a forward state, and a reverse state, wherein rotation of the input shaft in the first rotational direction of the actuator motor operates the transmission in the selected state, wherein the rotation of the input shaft in the second rotational direction cycles between the selectable states, wherein the forward state actuates the translator mechanism in first direction and the reverse state operates the translator mechanism in the second direction.

10. The actuator system of claim 9, wherein the translator mechanism includes a shiftable collar that is rotationally fixed to a transmission output shaft and selectively engages with an input gear fixed to the transmission input shaft or an output gear that rotates in an opposite direction of the input gear, wherein the shiftable collar cycles between engagement with the transmission input and output gears in response to actuation of the actuator motor in the second rotational direction, wherein the shiftable collar remains in its current position in response to rotation of the actuator motor in the first rotational direction.

11. The actuation system of claim 10, wherein the actuator motor operates in a single direction to shift the translator mechanism in both linear directions, with the translator mechanism shifting depending on the position of the selected state of the transmission and the position of the shiftable collar.

12. The actuation system of claim 3, wherein the translator mechanism includes a shift fork and a lock collar axially fixed relative to the shift fork, wherein rotation of the selectable output shaft in the first rotational directional causes axial movement of the shift fork and the lock collar in the first linear direction, and wherein rotation of the selectable output shaft in the second rotational direction causes axial movement of the shift fork and the lock collar in the second linear direction.

13. The actuation system of claim 12, wherein the translator mechanism includes a low speed driven gear that surrounds a final gear transfer shaft of a vehicle drivetrain, wherein the lock collar is rotatably fixed to the final gear transfer shaft and axially moveable relative to the final gear transfer shaft, wherein the lock collar has inner teeth and moves into meshed engagement with outer teeth of the low speed driven gear in response to movement in the first linear direction, such that torque transfers between the final gear transfer shaft and the low speed driven gear in the connected mode of the disconnect device.

14. The actuation system of claim 13, wherein an annular ring of the park lock is disposed axially between the low speed driven gear and the outer teeth of the low speed driven gear, wherein the annular ring includes inner teeth and the lock collar includes outer teeth, wherein additional linear movement of the lock collar in the first direction moves the lock collar into meshed engagement with the annular ring of the park lock, wherein the park lock is fixed against rotation and blocks rotation of the final gear transfer shaft.

15. The actuation system of claim 14, wherein movement of the lock collar in the second linear direction sequentially moves the lock collar out of engagement with the park lock and then out of engagement with the low speed driven gear.

16. The actuation system of claim 15, wherein the shift fork has a fork body extending around the selectable output shaft, wherein a cam having a slot is disposed inside of an inner chamber of the fork body, wherein a pin extends outwardly from the selectable output shaft and into the slot, wherein rotation of the pin translates the pin along the slot, such that the cam shifts axially relative to the pin and causes axial movement of the shift fork relative to the selectable output shaft.

17. The actuation system of claim 16, wherein the slot has a slot profile including, in sequential order, an initial segment, a first ramp portion, a first dwell segment, a second ramp portion, and a second dwell segment.

18. The actuation system of claim 17, wherein when the pin is in the initial segment, the disconnect device is in the disconnected state and the park lock is open, wherein when the pin is in the first ramp portion the lock collar is moving into engagement with the low speed driven gear, wherein when the pin is in the first dwell portion, the lock collar is engaged with the low speed driven gear and disconnect device is in the connected state and the park lock is open, wherein when the pin is in the second ramp portion, the lock collar is moving into engagement with the park lock and the lock collar remains in engagement with the low speed driven gear and the disconnect device is in the connected state, and wherein when the pin is in the second dwell segment the lock collar is engaged with the park lock and the low speed driven gear remains engaged with the lock collar and the disconnect device is in the connected state and the park lock is locked.

19. The actuation system of claim 18, wherein a rotary sensor is disposed adjacent the selectable output shaft and senses a rotation position of the selectable output shaft, wherein a linear sensor is disposed adjacent the shift fork and senses a linear position of the shift fork, wherein both the rotary sensor and the linear sensor provide a signal determinative of the state of the park lock and disconnected device.

20. The actuation system of claim 3, wherein the disconnect device and the park lock are disposed in a torque flow path between a differential, which drives ground-engaging wheels, and a low speed driven gear, which receives torque from a primary electric motor, wherein the disconnect device, park lock, and the oil pump are each controlled by the same actuator motor.

* * * * *